(12) United States Patent
Workman et al.

(10) Patent No.: US 9,024,570 B2
(45) Date of Patent: May 5, 2015

(54) CHARGING DEVICE

(75) Inventors: Robert Emmett Workman, Morgan, UT (US); Norm Krantz, Logan, UT (US); Walker Ford, Bluffdale, UT (US); Joseph R. Atkin, Highland, UT (US)

(73) Assignee: Goal Zero LLC, Bluffdale, UT (US)

( * ) Notice: Subject to any disclaimer, the term of this patent is extended or adjusted under 35 U.S.C. 154(b) by 380 days.

(21) Appl. No.: 13/463,341

(22) Filed: May 3, 2012

(65) Prior Publication Data

US 2012/0281392 A1 Nov. 8, 2012

Related U.S. Application Data

(60) Provisional application No. 61/483,515, filed on May 6, 2011.

(51) Int. Cl.
*H01M 10/44* (2006.01)
*H01M 10/46* (2006.01)
*H02J 7/35* (2006.01)

(52) U.S. Cl.
CPC ... *H02J 7/35* (2013.01); *H02J 7/355* (2013.01)

(58) Field of Classification Search
CPC .......... H02J 7/025; H02J 7/0027; H02J 7/00; H02J 9/005; H02J 2007/0067; H02J 3/14; H02J 5/005; H02J 7/0016
USPC .................. 320/101, 113, 115, 118, 121, 138
See application file for complete search history.

(56) References Cited

U.S. PATENT DOCUMENTS

| 6,806,684 | B2 * | 10/2004 | Matsuyama | 320/112 |
|---|---|---|---|---|
| D599,286 | S | 9/2009 | Horito et al. | |
| D600,000 | S | 9/2009 | Horito et al. | |
| D625,251 | S | 10/2010 | Workman et al. | |
| D629,746 | S | 12/2010 | Workman et al. | |
| 8,080,972 | B2 | 12/2011 | Smith | |
| D651,564 | S | 1/2012 | Workman et al. | |
| D664,499 | S | 7/2012 | Workman et al. | |
| 8,575,887 | B1 * | 11/2013 | Pomare | 320/101 |
| 2003/0141846 | A1 * | 7/2003 | Matsuyama | 320/132 |
| 2007/0216346 | A1 * | 9/2007 | Lu | 320/101 |
| 2008/0061739 | A1 * | 3/2008 | Lu | 320/114 |
| 2008/0143290 | A1 * | 6/2008 | Chavakula | 320/101 |

(Continued)

FOREIGN PATENT DOCUMENTS

WO WO 2011/106431 9/2011

OTHER PUBLICATIONS

U.S. Appl. No. 61/584,011, filed Jan. 6, 2012, Workman et al.

(Continued)

*Primary Examiner* — Brian Ngo
(74) *Attorney, Agent, or Firm* — Foley & Lardner LLP

(57) ABSTRACT

A charging device is provided. The charging device includes an input interface configured to receive electrical power from a power source and charge a removable energy storage device using the electrical power from the power source. The power source may be a solar panel. The charging device may include multiple input interfaces configured to receive electrical power at different voltages. The charging device may include an output interface configured to provide electrical power to an electrical device connected to the output interface, and the circuit may be configured to provide electrical power to the output interface from at least one of the removable energy storage device and the input interface.

13 Claims, 7 Drawing Sheets

(56) References Cited

U.S. PATENT DOCUMENTS

| | | | |
|---|---|---|---|
| 2009/0295234 A1* | 12/2009 | Lu et al. ......................... | 307/150 |
| 2011/0012552 A1* | 1/2011 | Margalit ......................... | 320/101 |
| 2011/0116254 A1 | 5/2011 | Workman et al. | |
| 2011/0162690 A1 | 7/2011 | Workman et al. | |
| 2011/0273133 A1* | 11/2011 | Sala ............................... | 320/101 |
| 2011/0290307 A1 | 12/2011 | Workman et al. | |
| 2013/0200841 A1* | 8/2013 | Farkas et al. ................... | 320/107 |
| 2013/0328530 A1* | 12/2013 | Beaston ......................... | 320/128 |

OTHER PUBLICATIONS

U.S. Appl. No. 61/584,005, filed Jan. 6, 2012, Workman et al.
U.S. Appl. No. 61/483,515, filed May 6, 2011, Workman et al.
U.S. Appl. No. 12/945,583, filed Nov. 12, 2010, Workman et al.
U.S. Appl. No. 29/387,865, filed Mar. 18, 2011, Workman et al.
U.S. Appl. No. 29/410,386, filed Jan. 6, 2012, Workman et al.
U.S. Appl. No. 29/410,376, filed Jan. 6, 2012, Workman et al.
U.S. Appl. No. 29/410,375, filed Jan. 6, 2012, Workman et al.
U.S. Appl. No. 29/410,374, filed Jan. 6, 2012, Workman et al.

* cited by examiner

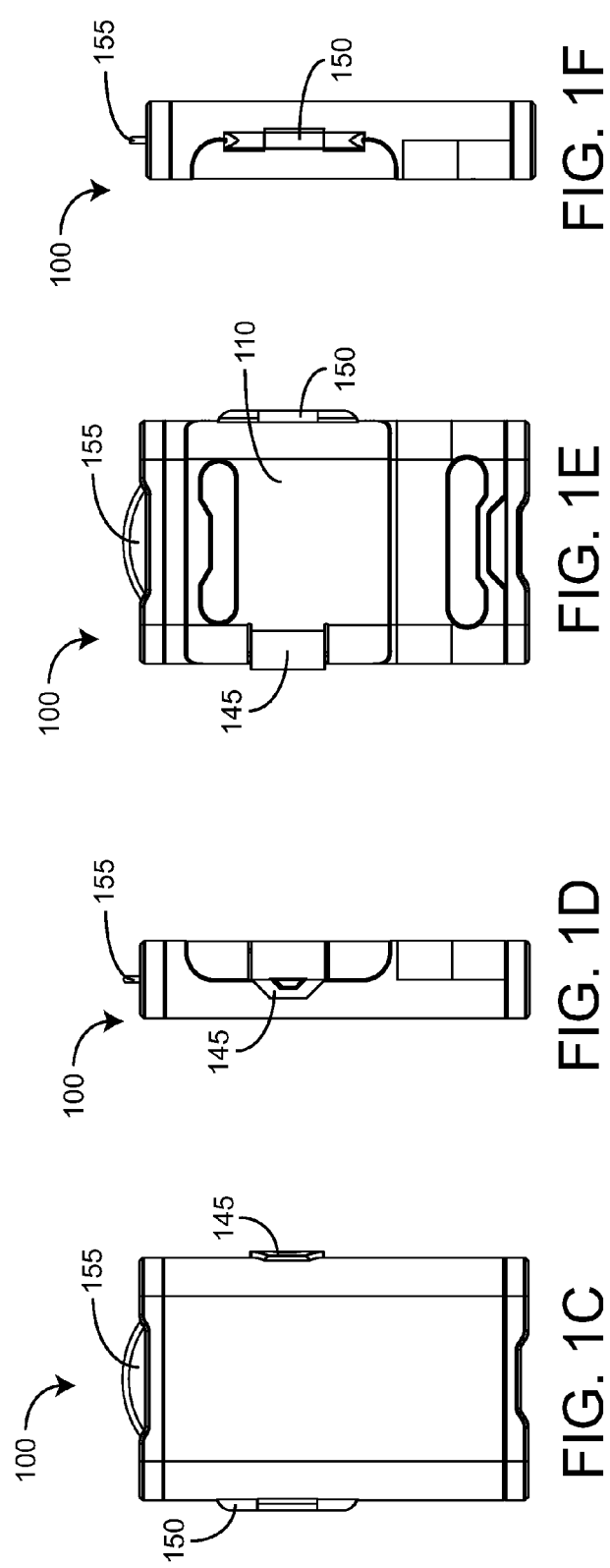

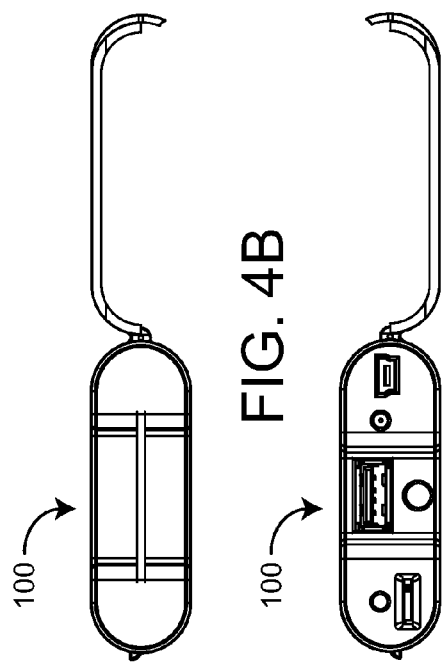
FIG. 4B
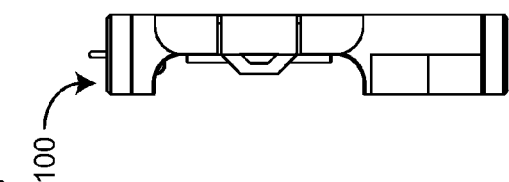
FIG. 4G
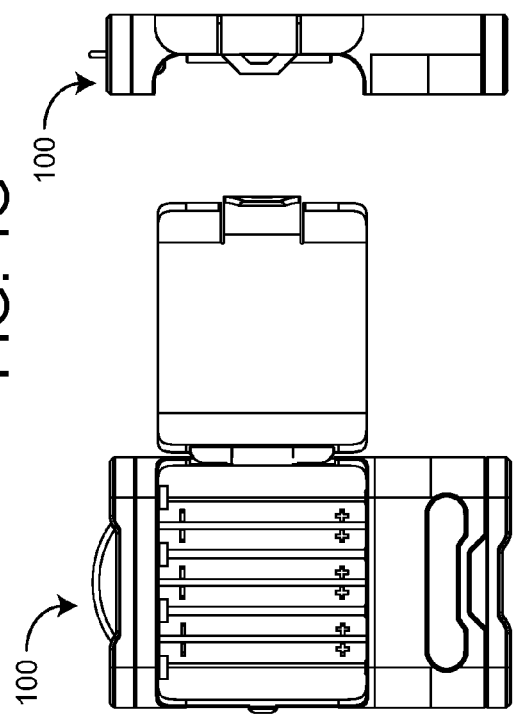
FIG. 4E
FIG. 4F
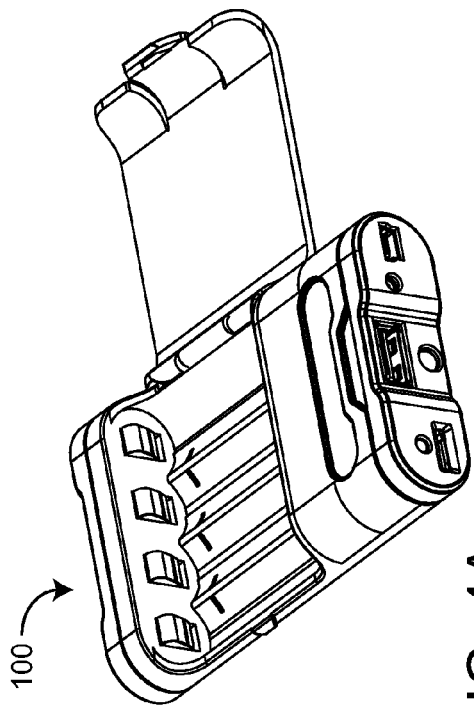
FIG. 4A
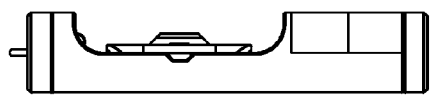
FIG. 4D
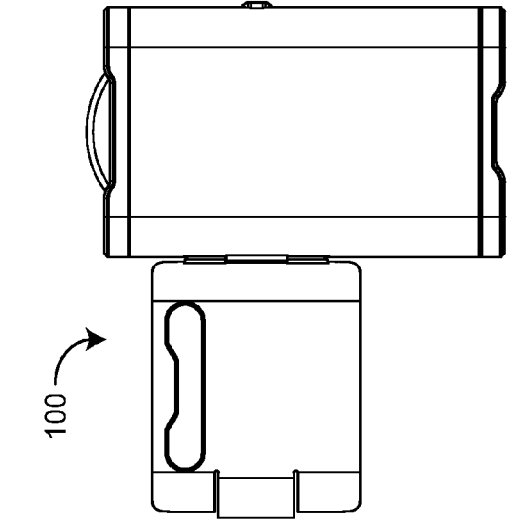
FIG. 4C

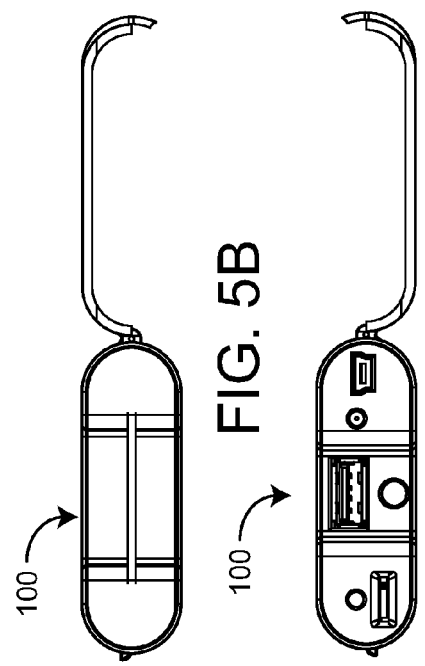
FIG. 5B
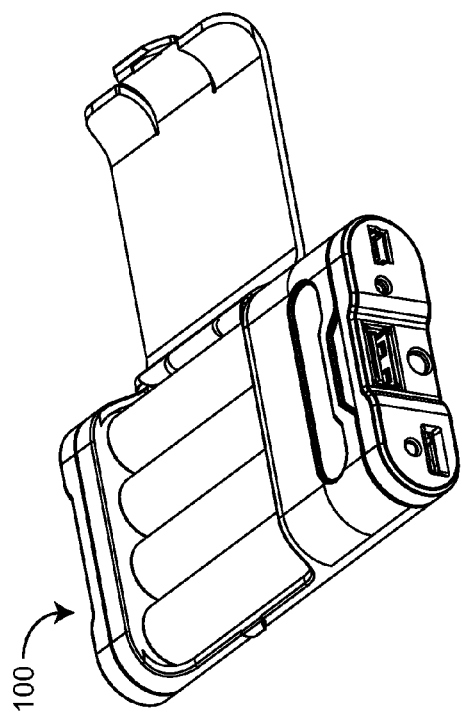
FIG. 5A
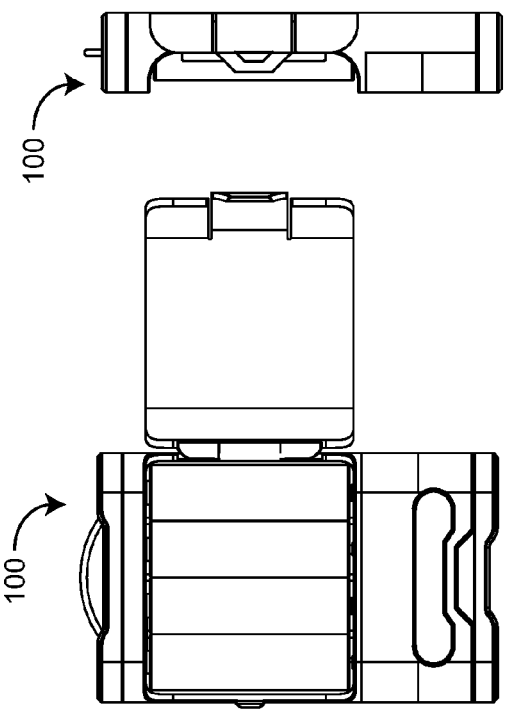
FIG. 5G / FIG. 5E / FIG. 5F
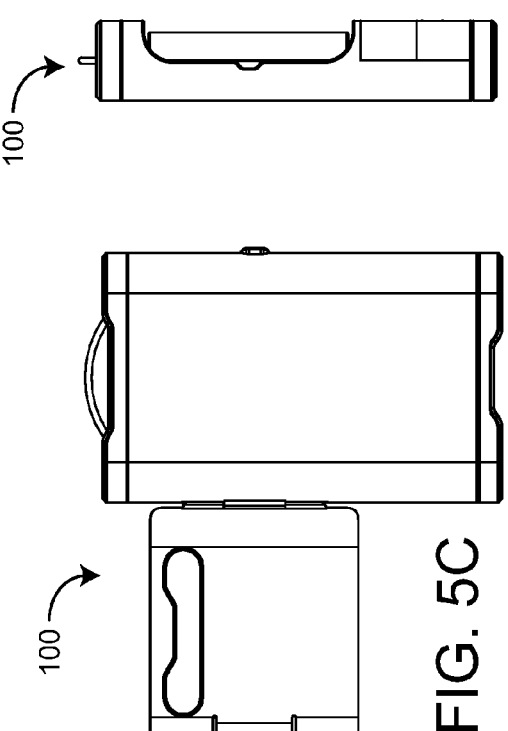
FIG. 5D / FIG. 5C

US 9,024,570 B2

CHARGING DEVICE

CROSS REFERENCE TO RELATED APPLICATIONS

The present Application claims the benefit of priority under 35 U.S.C. §119(e)(1) of U.S. Provisional Patent Application No. 61/483,515, titled "Charging Device" and filed on May 6, 2011, the complete disclosure of which is incorporated herein by reference.

BACKGROUND

The present disclosure relates generally to the field of charging devices and methods. According to some embodiments, the present disclosure relates to a device for charging rechargeable energy storage devices (e.g., batteries) and/or for charging other devices using rechargeable energy storage devices and/or an external power source.

Electrical devices often use batteries as an electrical power source for operating the devices when away from a power outlet. Batteries are used, for example, in flashlights, remote controls, computing devices (e.g., handheld computers) and accessories (e.g., keyboards, mice, etc.), mobile entertainment devices (e.g., game systems and components, audio/video players, etc.), and various other types of electrical devices. The use of batteries to power an electrical device for a length of time without the need to plug the device into a wall socket or other energy source may enhance the mobility of the device.

Electrical devices may be designed to utilize built-in batteries and/or removable batteries. Rechargeable batteries used in electrical devices that utilize built-in or fixed batteries are often recharged from within the device by connecting a power source to the device itself. Devices designed such that the batteries are removable may be configured to accept non-rechargeable batteries, rechargeable batteries, or both. In some devices, removable rechargeable batteries may be recharged directly within the device in a manner similar to fixed batteries. Another method of charging the removable rechargeable batteries is to charge the batteries in a separate charging device. Using a separate charging device allows the electrical device to be used with one set of batteries while another set of batteries is being recharged for later use.

SUMMARY

One embodiment of the disclosure relates to a charging device comprising an input interface and a circuit. The input interface is configured to receive electrical power from a solar panel. The circuit is configured to charge a removable energy storage device using the electrical power received from the solar panel.

Another embodiment of the disclosure relates to a charging device comprising a first input interface, a second input interface, and a circuit. The first input interface is configured to receive electrical power having a first voltage. The second input interface is configured to receive electrical power having a second voltage from a power source. The second voltage is different than the first voltage. The circuit is configured to charge a removable energy storage device using at least one of the electrical power received at the first input interface and the electrical power received at the second input interface.

Another embodiment of the disclosure relates to a charging device comprising an input interface, and output interface, and a circuit. The input interface is configured to receive electrical power from a power source. The output interface is configured to provide electrical power to an electrical device connected to the output interface. The circuit is configured to charge a removable energy storage device using the electrical power received from the power source at the input interface and to provide electrical power to the output interface from at least one of the removable energy storage device and the input interface.

BRIEF DESCRIPTION OF THE DRAWINGS

FIGS. 1A through 1G are various illustrative views of a charging device according to an exemplary embodiment.

FIGS. 4A through 4G are various illustrative views of the charging device of FIGS. 1A through 1G with a battery door in a fully open position according to an exemplary embodiment.

FIGS. 5A through 5G are various illustrative views of the charging device of FIGS. 4A through 4G with batteries inserted into the battery compartment according to an exemplary embodiment.

DETAILED DESCRIPTION

Figure 2G:
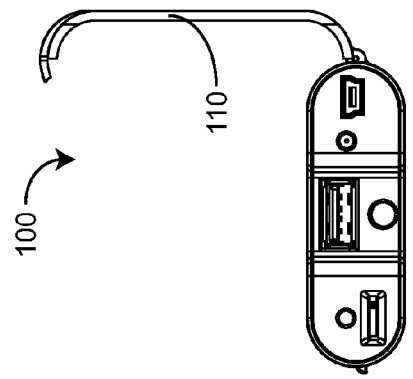
FIGS. 2A through 2G are various illustrative views of the charging device of FIGS. 1A through 1G with a battery door in a partially open position according to an exemplary embodiment.
Figure 2F:
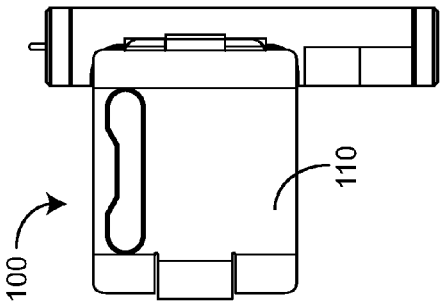
Figure 2B:
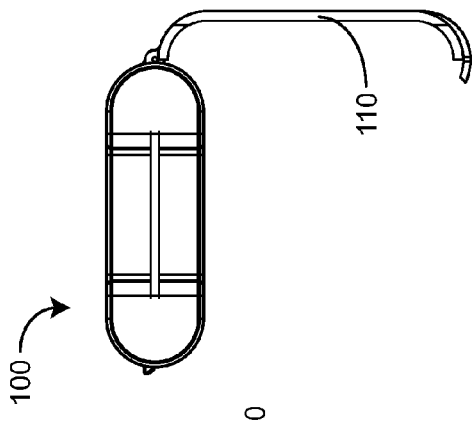

Referring generally to the figures, devices and methods for charging rechargeable energy storage devices, such as batteries, and/or for charging electrical and/or electronic devices are shown and described according to various exemplary embodiments. In some embodiments, a charging device may be configured to charge one or more removable batteries using electrical energy received from one or more external sources. In various embodiments, the batteries may be of any size (AAA, AA, C, D, 9-volt, etc.) and/or type (alkaline, lithium ion, nickel metal hydride (NiMH), etc.). The batteries may be placed in a compartment in the device or otherwise electrically connected to terminals of the device for charging. The charging device may be connected to an external energy source, such as an electrical outlet (e.g., a 110 volt outlet connected to the device through a transformer that transforms the electrical signal to a lower voltage) or a computer (e.g., through a Universal Serial Bus, or USB, connector or other type of connector) that provides the power to charge the batteries. In some embodiments, the charging device may be configured to receive electrical power for charging the batteries from a solar panel (e.g., a mobile solar panel).

In some embodiments, the charging device may be configured to receive power from multiple sources. For example, the charging device may be configured to receive power from a USB power source through a USB input (e.g., a mini-USB port) and from a solar panel through a solar input. In some embodiments, the charging device may be configured to charge the batteries using one power source at a time (e.g., as determined by a user via a selection switch). In other embodiments, the charging device may be configured to charge the batteries using two or more power sources simultaneously.

In some embodiments, the charging device may also be configured to charge another electrical or electronic device using power from the batteries and/or the input power sources. For example, the charging device may be configured to charge a cellular telephone, mobile computing device (e.g., smartphone, handheld computing device, laptop computer, etc.), mobile entertainment device (e.g., media player, gaming device, etc.), or other type of electrical device using energy stored in the batteries. In some embodiments, the charging device may be configured to additionally or alternatively charge the electrical device using energy from the one or more input power sources.

Referring now to FIGS. 1A through 1G, various illustrative views of a charging device 100 are shown according to an exemplary embodiment. Charging device 100 is configured to charge four cylindrical batteries (e.g., AA or AAA batteries) using one or both of two power inputs, a USB input 115 and a solar input 120. In other embodiments, a charging device may be configured to charge batteries of different types, sizes, shapes, chemistries, etc. In such embodiments, part or all of the shape of the charging device may be different from charging device 100 and may be designed based in part on the type and/or shape of the battery being charged. Charging device 100 is also configured to charge another electrical device through a power output 125.

Figure 2E:
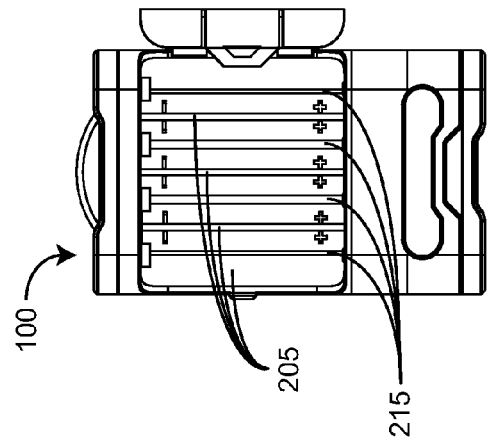
Figure 2A:
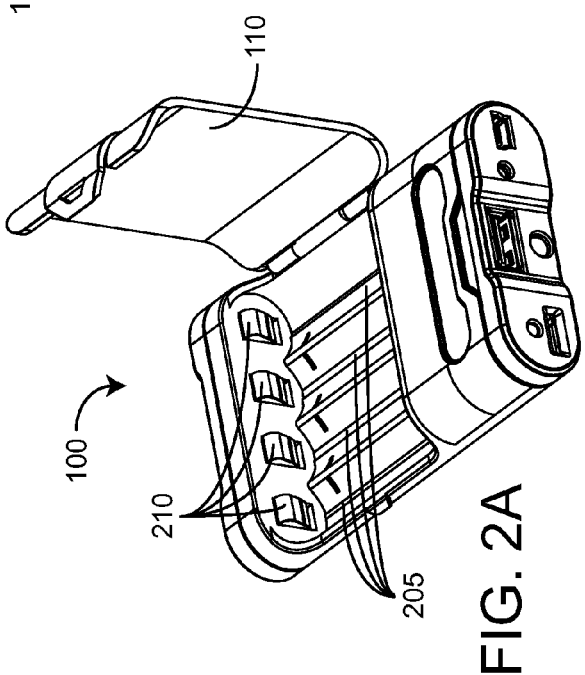
Figure 2D:
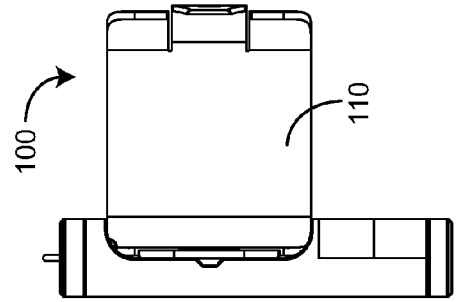
Figure 2C:
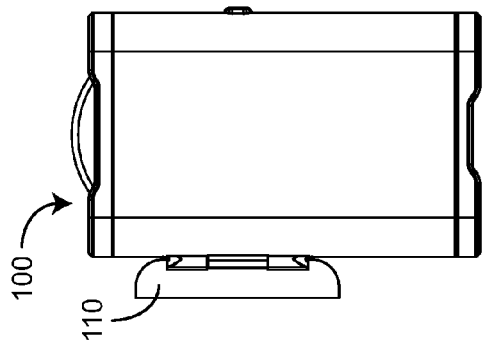
Figure 3B:
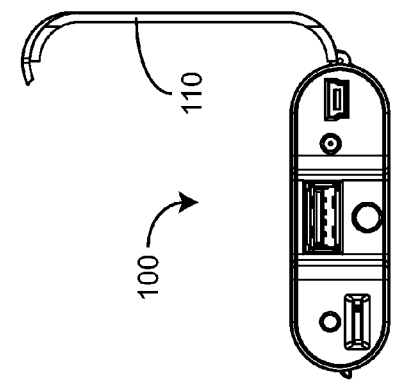
FIGS. 3A through 3G are various illustrative views of the charging device of FIGS. 2A through 2G with batteries inserted into the battery compartment according to an exemplary embodiment.
Figure 3A:
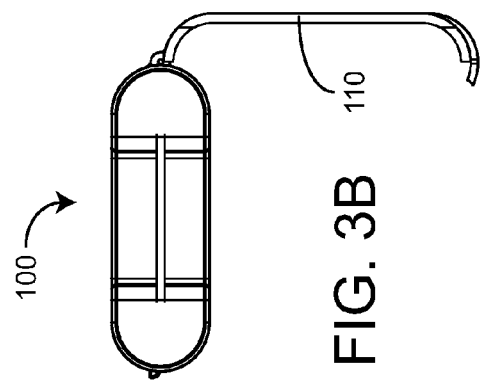
Figure 3G:
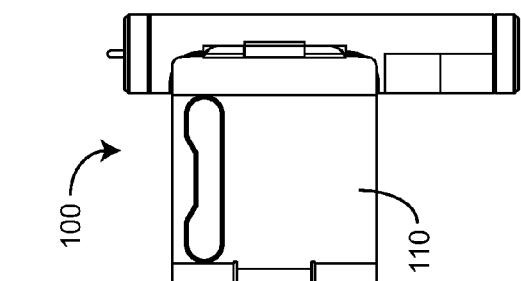
Figure 3E:
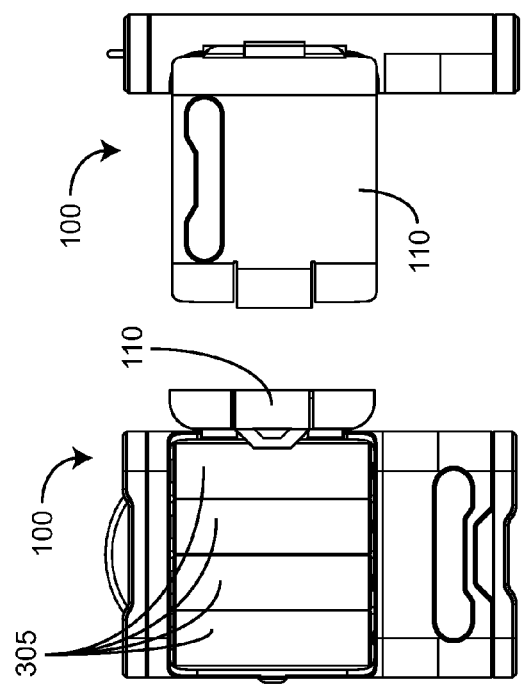
Figure 3C:
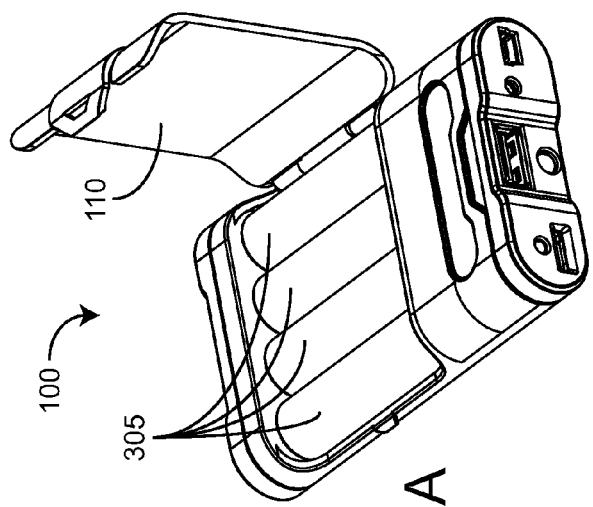
Figure 3D:
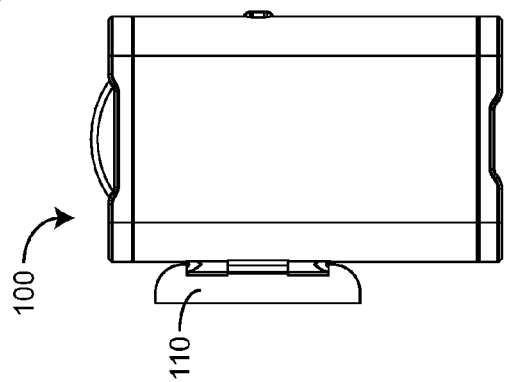
Figure 3F:
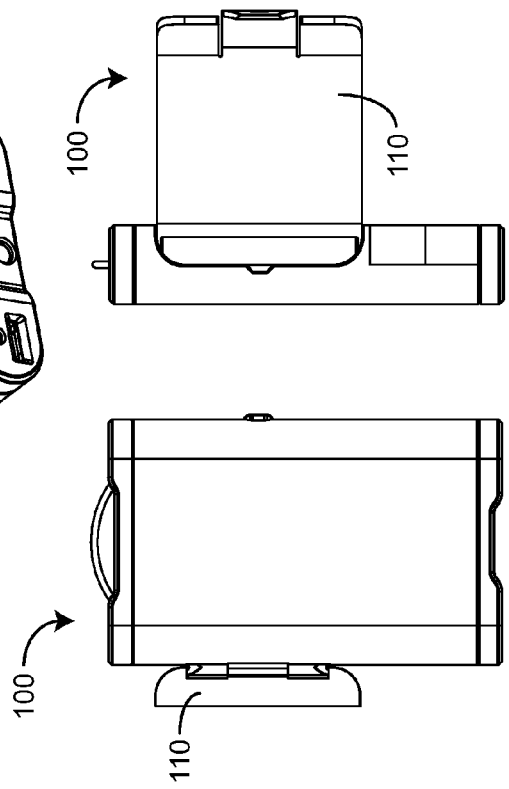

Referring specifically to FIG. 1A, charging device 100 includes a housing 105 configured to house various components of charging device 100. Housing 105 includes a battery door 110 that, when closed, is configured to cover the rechargeable batteries when the batteries are placed in the battery compartment (not shown in FIG. 1A; illustrated in FIGS. 2A and 2E). Housing 105 includes a hinge 150 configured to rotatably couple battery door 110 to the rest of housing 105 and a latch 145 configured to hold the battery door closed. In some embodiments, the batteries may be secured within charging device 100 in a different manner (e.g., using a sliding door, a door secured using fasteners such as screws, etc).

In some embodiments, housing 105 may be configured to call attention of the user to the battery compartment. For example, battery door 110 may be completely or partially transparent or translucent. In some embodiments, latch 145 and/or hinge 150 may be configured to be highly visible to the user (e.g., through size, shape, color, etc.). In some embodiments, battery door 110 and/or other portions of housing 105 may include one or more blank portions that enable a user to see the contents of the battery compartment and determine whether or not batteries are inserted into charging device 100 without opening battery door 110.

Charging device 100 is configured to charge the batteries using electrical power from input power sources, including USB input 115 and solar input 120. USB input 115 is configured to receive electrical power from a power source through a mini-USB input port. Power received at USB input 115 may be approximately 5 volts direct current (5 VDC) (e.g., between 4.75 VDC and 5.25 VDC).

Solar input 120 is configured to receive electrical power from a solar panel connected to charging device 100. In some embodiments, solar input 120 may be configured to receive power input from a particular solar panel or a particular type of source (e.g., having a particular voltage and/or current level and/or range). For example, solar input 120 may be configured to receive power from a solar panel configured to output power at a voltage of approximately 6.5 VDC. In some embodiments, solar input 120 may be configured to receive power having different voltages (e.g., approximately 18 VDC, approximately 10 VDC, etc.). In some such embodiments, solar input 120 and/or other components of charging device 100 may be configured to reduce the voltage of the input power before using the power to charge the batteries. In some embodiments, solar input 120 may be configured to receive power from various different types of solar panels. In some embodiments, charging device 100 may be configured to charge the batteries using power received at solar input 120 without regulating or altering the voltage of the input power signal (e.g., by sending the "raw" power received at solar input 120 directly to charging circuits of charging device 100 without substantially altering or restricting a voltage and/or current of the received power signal).

For example, in one embodiment, charging device 100 may be configured to charge a set of AA batteries, and solar input 120 may be configured to receive unregulated power having a voltage of 6.5 V from a solar device (e.g., solar panel) connected to solar input 120 (e.g., 6.5 V may be a native output voltage of the solar device). The unregulated 6.5 V input power may be used to charge the AA batteries. The use of power at a voltage of 6.5 V may be beneficial or, in some embodiments, required to charge certain types of batteries (e.g., AA, AAA, etc.). Using unregulated 6.5 V power received at solar input 120 may be substantially more efficient (e.g., waste less energy, charge the batteries more quickly, etc.) than receiving power having another voltage, such as 5 V input power from USB input 115 or 12 V power from a solar panel, and converting the voltage up or down to 6.5 V. Using a regulated input source and converting the voltage may result in a longer charging time (e.g., less input current may be obtained through a regulated 5 V source that is upconverted to 6.5 V) and/or loss of energy between the power received at the input and the power actually used to charge the batteries (e.g., due to power dissipation of components used to convert the voltage to 6.5 V).

In other embodiments, charging device 100 may be configured to regulate or alter the voltage and/or current of the power received at USB input 115 and/or solar input 120 before charging the batteries. For example, in one embodiment, charging device 100 may be configured to boost the voltage of power received at USB input 115 from approximately 5 VDC to approximately 6.5 VDC to match the voltage of the signal received at the solar input 120.

Inputs 115 and 120 are configured to be electrically connected to the batteries through terminals in the battery compartment. In some embodiments, the batteries may be charged using one of USB input 115 and solar input 120 at a time. In other embodiments, charging device 100 may be configured to charge the batteries by simultaneously using power received at USB input 115 and solar input 120. Using both inputs simultaneously reduces the amount of time needed to charge the batteries as the charging current is higher than if only one of inputs 115 and 120 was used at a time.

Charging device 100 is configured to output power from the batteries and/or from one or both of inputs 115 and 120 for use in charging and/or powering an external electrical or electronic device through a power output 125. In some embodiments, power output 125 may be a standard format or type of port utilized by a variety of devices. For example, power output 125 as illustrated in FIGS. 1A through 5G is a standard USB port and may output power at approximately 5 VDC. In other embodiments, power output 125 may be any type or format, including a proprietary output configured to power a particular device or group of devices, and may output power at any defined voltage level. In some embodiments, charging device 100 may include more than one output port. For example, charging device 100 may include a USB output port and another type of output port and the user may charge devices off of one port or the other, or both.

Charging device 100 may also include a light 130 that may be used to provide illumination for the user. For example, light 130 may be used by a camper to illuminate the surrounding environment during nighttime. In some embodiments, light 130 may be a light emitting diode (LED) or other type of illumination device. As with power output 125, light 130 may be powered or driven by the batteries, power received at one or both of USB input 115 and solar input 120, or both batteries and power from input sources.

Charging device 100 may include an indicator 135. Indicator 135 may include a visual indicator, such as a light (e.g., a single color LED, a multi-color LED, two or more different-colored LEDs, etc.), and/or an audio indicator. Indicator 135 may be configured to indicate a status associated with charging device 100. For example, indicator 135 may indicate whether an input power source is plugged in and/or active, whether batteries are charging or discharging, a charge level or status of the batteries, whether power output 125 is active, and/or any other condition, setting or mode associated with charging device 100. In some embodiments, different colors (e.g., green, red, blue, yellow, etc.) may be used to indicate different conditions.

Charging device 100 may include a switch 140 or other type of input (e.g., selector switch, toggle switch, button, etc.) configured to allow a user to set a mode of charging device 100. One mode may include an "off" mode in which power output 125 is disabled. In the "off" mode, power is not provided to an electrical device even if it is connected to power output 125. In some embodiments, power received at USB input 115 and/or solar input 120 may still be used to charge the batteries even if switch 140 is set to "off" mode. In an "on" mode, charging device 100 is configured to enable power output 125 to provide power to a connected electrical device. In some embodiments, in the "on" mode, power received at USB input 115 and/or solar input 120 may be used to charge the batteries, provide power to power output 125, or both. In a "light" mode, light 130 may be activated to provide illumination. In some embodiments, power output 125 may be deactivated in "light" mode. In other embodiments, power output 125 may be activated in "light" mode. In various embodiments, other modes may be enabled for selection by a user, such as modes in which one or both of USB input 115 and solar input 120 are activated or disabled.

Referring now to FIGS. 1B through 1G, various different views of charging device 100 are shown. FIGS. 1B, 1C, 1D, 1E, 1F, and 1G illustrate top, back, first side, front, second side, and bottom views of charging device 100, respectively. In addition to various features described with respect to FIG. 1A, FIGS. 1B through 1F illustrate a carrying bar 155 that is not visible in the view shown in FIG. 1A. Carrying bar 155 may be used to carry charging device 100 and/or to connect charging device 100 to another article such as a bag (e.g., via a strap).

Referring now to FIGS. 2A through 2G, various illustrative views of charging device 100 (corresponding to FIGS. 1A through 1G, respectively) with battery door 110 in a partially open position are shown according to an exemplary embodiment. The battery compartment of charging device 100 is visible in FIGS. 2A and 2E and includes a battery slot 205 for each battery. Each battery slot includes a negative terminal 210 and a positive terminal 215 used to electrically connect the batteries to the circuitry of charging device 100.

FIGS. 3A through 3G illustrate the same views of charging device 100 shown in FIGS. 2A through 2G, respectively, with batteries 305 inserted into battery slots 205. FIGS. 4A through 4G provide various illustrative views of charging device 100 (corresponding to FIGS. 1A through 1G, respectively) with battery door 110 in a fully open position. FIGS. 5A through 5G illustrate the same views of charging device 100 shown in FIGS. 4A through 4G, respectively, with batteries 305 inserted into battery slots 205.

Figure 6:
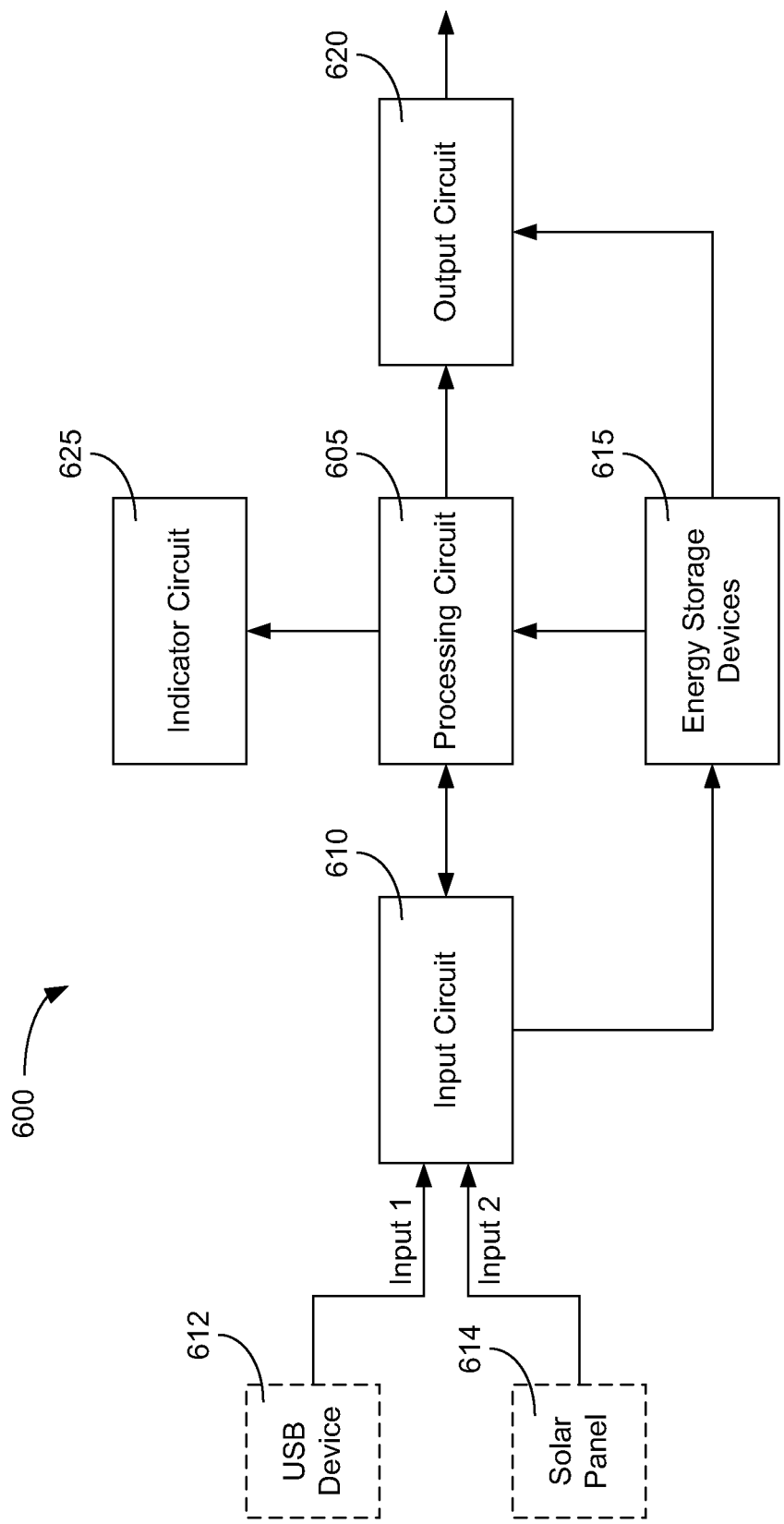
FIG. 6 is a block diagram of a circuit of a charging device according to an exemplary embodiment.

Referring now to FIG. 6, a block diagram of a circuit 600 of a charging device is shown according to an exemplary embodiment. Circuit 600 may be enclosed within housing 105 and may be used to perform various functions of charging device 100. Circuit 600 includes an input circuit 610 configured to receive electrical power from one or more power sources. In some embodiments (e.g., charging device 100), input circuit 610 may be configured to receive electrical power from a USB device 612 at a USB input and a solar panel 614 at a solar input. In some embodiments, input circuit 610 may be configured to transform or adjust a voltage of a power signal received at one or more inputs before transmitting the power signal to energy storage devices 615 and/or output circuit 620. For example, input circuit 610 may be configured to boost a voltage of a signal received from USB device 612 (e.g., a 5 VDC signal) to match the voltage of a signal received from solar panel 614 (e.g., 6.5 VDC, 18 VDC, etc.). The electrical power signals received by input circuit 610 may be transmitted to energy storage devices 615 (e.g., batteries) and used to charge energy storage devices 615.

Energy stored in energy storage devices 615 and/or power received at input circuit 610 may be used to drive an output circuit 620. Output circuit 620 may provide power to charge and/or operate a connected electrical device. In some embodiments (e.g., charging device 100), output circuit 620 may output power through a USB port. In other embodiments, output circuit 620 may output power through any other type of standard or proprietary interface. In some embodiments, input circuit 610 may be connected directly to output circuit 620 and may be configured to provide power to output circuit 620 regardless of whether energy storage devices 615 are inserted into the charging device.

Circuit 600 may also include a processing circuit 605 configured to control operation of various components of circuit 600. In some embodiments, processing circuit 605 may be configured to activate or disable (e.g., based on the occurrence of certain conditions, based on user input, etc.) input circuit 610 (e.g., such that power received from input devices is not transmitted to energy storage devices 615 and/or power output 620) and/or output circuit 620 (e.g., such that power is not transmitted to an electrical device connected to output circuit 620). Processing circuit 605 may be configured to receive an input to monitor the charge voltage of energy storage devices 615. Processing circuit 605 may be configured to provide control and/or power signals to an indicator circuit 625 configured to indicate the occurrence of certain conditions or modes. Indicator circuit 625 may include one or more lights, such as LEDs. In some embodiments, indicator circuit 625 may include a multicolor LED or multiple LEDs of different colors and each color may be used to indicate a different condition. For example, different colors may be used to indicate that energy storage devices 615 are being charged, energy storage devices 615 are being discharged through output circuit 620, etc.

Figure 7:
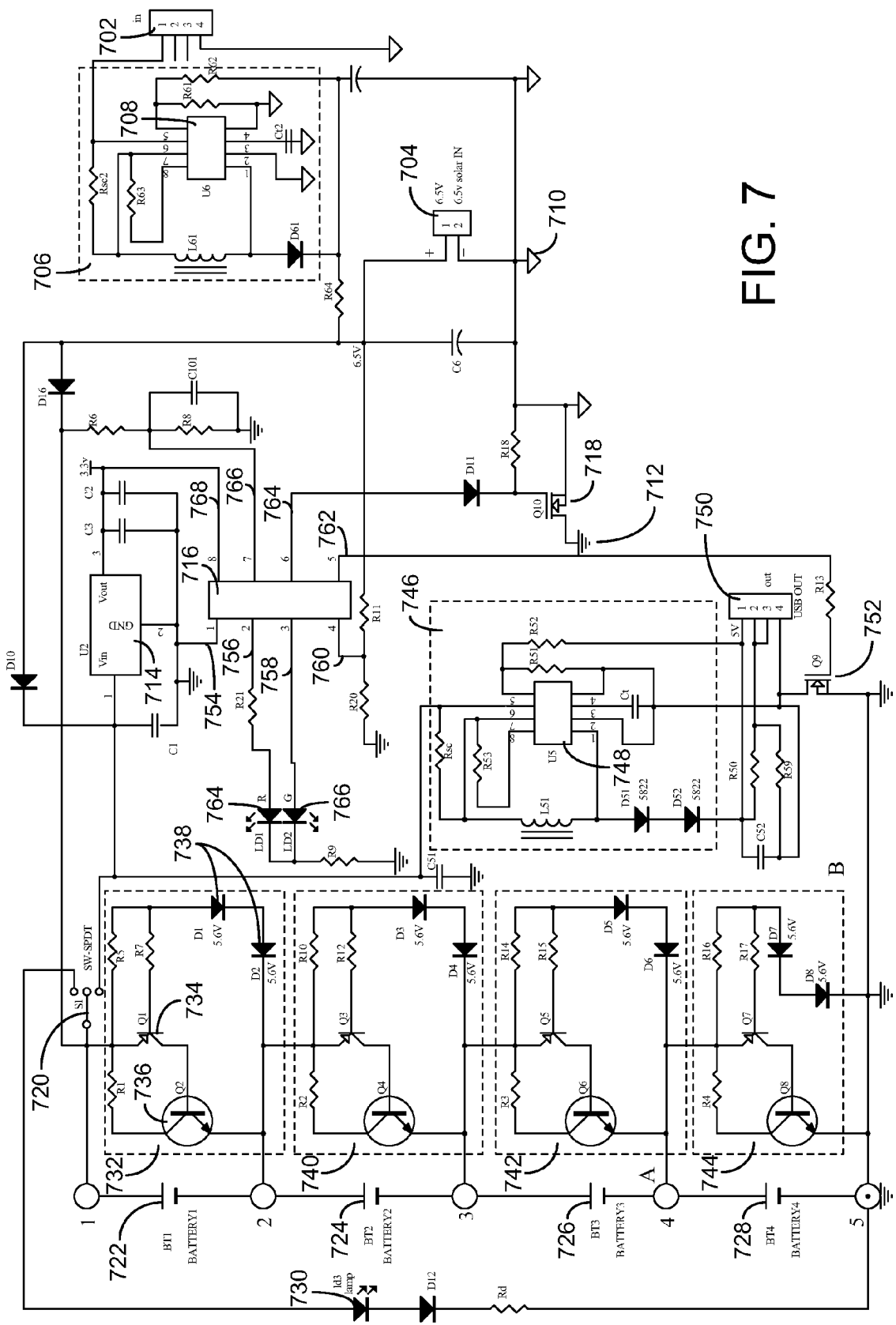
FIG. 7 is a circuit diagram of a circuit of a charging device according to an exemplary embodiment.

Referring now to FIG. 7, a circuit diagram of a circuit 700 of a charging device is shown according to an exemplary embodiment. Circuit 700 may be a more detailed embodiment of circuit 600 shown in FIG. 6 and/or may be enclosed within housing 105 and used to perform various functions of charging device 100.

Circuit 700 includes two input interfaces for receiving power from power sources. The first input interface is a USB input 702 configured to receive electrical power through a mini USB port. USB input 702 may be configured to receive input power having a voltage of approximately 5 VDC. The second input interface is a solar input 704 configured to receive input power from a solar panel. In some embodiments, solar input 704 may be configured to receive input power having a voltage of approximately 6.5 VDC. In some embodiments, power received at solar input 704 may be transmitted to batteries 722, 724, 726, and/or 728 without being substantially regulated, such that any available power generated by the solar panels connected to solar input 704 is transmitted to batteries 722, 724, 726, and/or 728. Such embodiments may enable efficient utilization of power generated by solar panels, as the power generated by solar panels may fluctuate (e.g., based on available sunlight). Circuit 700 includes a boost circuit 706, including a boost controller 708, configured to boost the voltage of the power signal received at USB input 702 (e.g., approximately 5 VDC) to match the voltage of the power signal received at solar input 704. The power signals from boost circuit 706 and/or solar input 704 are sent forward to charge batteries 722, 724, 726, and/or 728 and/or drive USB output 750.

Power from the input circuits is used to charge batteries 722, 724, 726, and/or 728. Circuit 700 includes a separate charging circuit 732, 740, 742, 744 dedicated to charging each of batteries 722, 724, 726, and 728, respectively. Charging circuit 732 includes transistors 734 and 736 and diodes 738. Transistor 734 may be a control signal transistor (e.g., a relatively small transistor) and transistor 736 may be a power signal transistor (e.g., a large transistor). If battery 722 has less than a full charge or less than a predetermined level of charge (e.g., as determined by values associated with diodes 738), transistor 734 activates transistor 736 and the input power signal is used to charge battery 722. If battery 722 is charged to a predetermined level (e.g., 5.6 V), the input power will bypass battery 722 through diodes 738 and proceed to charging circuit 740 associated with battery 724. Charging circuits 740, 742, and 744 include similar or identical components to those of charging circuit 732. Some charging circuits disable charging as soon as one battery has reached full capacity. Charging circuits 732, 740, 742, and 744 allow batteries 722, 724, 726, and 728 to continue charging until all the batteries have reached the predetermined charge level, even if one or more of the batteries reaches the predetermined charge level before the others have reached the charge level.

Switch 720 is configured to control the output path of power stored in batteries 722, 724, 726, and 728 and/or input power received using USB input 702 and/or solar input 704. The middle terminal represents an "off" mode in which input power is used to charge batteries 722, 724, 726, and 728, but neither input power nor power from batteries 722, 724, 726, and 728 is used to drive USB output 750 or LED 730.

The upper terminal is used in a "light" mode in which power from batteries 722, 724, 726, and 728 and/or input power is used to drive an LED 730. LED 730 is configured to provide illumination for a user of the charging device.

The lower terminal is used in an "on" mode in which power from batteries 722, 724, 726, and 728 and/or input power is used to drive USB output 750. Conversion circuit 746, including a conversion controller 748, is used to convert power from batteries 722, 724, 726, and 728 and/or input power to a voltage needed to USB output 750 (e.g., approximately 5 VDC). In various embodiments, the power output interface may utilize various different voltages. Power from conversion circuit 746 is provided to USB output 750 to be transmitted to an electrical device, if attached to USB output 750.

Circuit 700 also includes a processing circuit 716 configured to control various features of the charging device. A control power circuit 714 is configured to receive power from batteries 722, 724, 726, and 728 and/or input power from USB input 702 and/or solar input 704 and convert the power signal into a voltage that may be used by processing circuit 716 (e.g., 3.3 V). The control power signal (e.g., 3.3 V) is received by processing circuit 716 at input 768. Input 754 is connected to an electrical ground 712. Input 766 is configured to detect a voltage of the input power signal received from USB input 702 and/or solar input 704. Input 766 may be used by processing circuit 716 to determine if an input power source is connected to USB input 702 or solar input 704. Input 760 is configured to detect a voltage of the input power signal received from solar input 704 and may be used to determine if input power from solar input 704 is available.

Output 764 is used to enable or disable power input from USB input 702 and/or solar input 704. Transistor 718 is connected at a first terminal to a main electrical ground 712 and at a second terminal to an input electrical ground 710. Activating transistor 718 electrically connects grounds 710 and 712 and disables input from USB input 702 and solar input 704. Output 762 may be used to enable or disable power output at USB output 750.

Outputs 756 and 758 are configured to drive indicators 764 and 766, respectively. Indicators 764 and 766 may be LEDs having different colors. Processing circuit 716 may be configured to activate or deactivate indicators 764 and 766 upon occurrence of certain conditions. For example, processing circuit 716 may be configured to activate indicator 764, displaying a red light to a user, when an input source is connected to USB input 702 and/or solar input 704 and the batteries are charging. Processing circuit 716 may be configured to activate indicator 766, displaying a green light to a user, when the charging device is in an "on" mode and power is being provided to USB output 750. Various other indicator types and indication conditions may be used in various embodiments.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and/or program products on any machine-readable media for accomplishing its operations. The embodiments of the present disclosure may be implemented using an existing computer processor, or by a special purpose computer processor incorporated for this or another purpose or by a hardwired system. Any type of processor may be used (e.g., FPGA, ASIC, ASIP, CPLD, SDS, etc.). No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A charging device comprising:
   a first input interface configured to receive electrical power from a solar panel, wherein the first input interface comprises a solar input interface that defines a dedicated solar input configured to receive power input from at least one of a particular solar panel and a particular type of solar panel;
   a second input interface configured to receive electrical power from a second power source, wherein the second input interface comprises a Universal Serial Bus interface; and
   a circuit coupled to the first input interface and the second input interface, wherein the circuit is configured to charge a removable energy storage device using the electrical power received from the solar panel and the second power source, wherein the solar input interface is configured to receive electrical power having a first voltage and the Universal Serial Bus interface is configured to receive electrical power having a second voltage that is different than the first voltage, and wherein the first voltage is approximately 6.5 volts and the second voltage is approximately 5 volts,
   wherein the circuit includes a boost circuit coupled to the second input interface and configured to boost the voltage of the power received at the second input interface from approximately 5 volts to approximately 6.5 volts to match the voltage of the power received at the first input interface.

2. The charging device of claim 1, wherein the energy storage device is one of a AA battery or a AAA battery, and wherein the circuit is configured to charge one of a plurality of AA batteries or a plurality of AAA batteries using the electrical power received from the solar panel.

3. The charging device of claim 1, further comprising an output interface configured to provide electrical power to an electrical device connected to the output interface, wherein the electrical power is provided to the output interface from at least one of the removable energy storage device and the solar input interface.

4. The charging device of claim 1, wherein the circuit is configured to charge a plurality of energy storage devices, wherein the circuit comprises a charging circuit for each of the plurality of energy storage devices, wherein each charging circuit is configured to charge an energy storage device until the energy storage device has reached a predetermined charge level and the circuit is configured to continue charging the plurality of energy storage devices until all energy storage devices have reached the predetermined charge level.

5. A charging device comprising:
   a first input interface configured to receive electrical power having a first voltage, wherein the first input interface comprises a solar input interface that defines a dedicated solar input configured to receive power input from at least one of a particular solar panel and a particular type of solar panel;
   a second input interface configured to receive electrical power having a second voltage from a power source, wherein the second input interface comprises a Universal Serial Bus interface, wherein the second voltage is different than the first voltage, and wherein the first voltage is approximately 6.5 volts and the second voltage is approximately 5 volts; and a circuit coupled to the first input interface and the second input interface, wherein the circuit is configured to charge a removable energy storage device using at least one of the electrical power received at the first input interface and the electrical power received at the second input interface wherein the circuit includes a boost circuit coupled to the second input interface and configured to boost the voltage of the power received at the second input interface from approximately 5 volts to approximately 6.5 volts to match the voltage of the power received at the first input interface.

6. The charging device of claim 5, wherein the energy storage device is one of a AA battery or a AAA battery, and wherein the circuit is configured to charge one of a plurality of AA batteries or a plurality of AAA batteries using electrical power received from at least one of the solar interface and the Universal Serial Bus interface.

7. The charging device of claim 5, further comprising an output interface configured to provide electrical power to an electrical device connected to the output interface, wherein the electrical power is provided to the output interface from at least one of the removable energy storage device, the first input interface, and the second input interface.

8. The charging device of claim 5, wherein the circuit is configured to charge a plurality of energy storage devices, wherein the circuit comprises a charging circuit for each of the plurality of energy storage devices, wherein each charging circuit is configured to charge an energy storage device until the energy storage device has reached a predetermined charge level and the circuit is configured to continue charging the plurality of energy storage devices until all energy storage devices have reached the predetermined charge level.

9. a first input interface configured to receive electrical power from a power source, wherein the first input interface comprises a solar input interface configured to receive electrical power having a first voltage, the solar input interface defining a dedicated solar input configured to receive power input from at least one of a particular solar panel and a particular type of solar panel;

a second input interface configured to receive electrical power having a second voltage that is different than the first voltage, wherein the second input interface comprises a Universal Serial Bus interface, wherein the first voltage is approximately 6.5 volts and the second voltage is approximately 5 volts an input interface configured to receive electrical power from a power source;

an output interface configured to provide electrical power to an electrical device connected to the output interface; and a circuit coupled to the first input interface and the second input interface and configured to charge a removable energy storage device using the electrical power received from the power source at the first input interface and the second input interface and to selectively provide electrical power to the output interface from the first input interface and the second input interface, wherein the circuit includes a boost circuit coupled to the second input interface and configured to boost the voltage of the power received at the second input interface from approximately 5 volts to approximately 6.5 volts to match the voltage of the power received at the first input interface.

10. The charging device of claim 9, wherein the energy storage device is one of a AA battery or a AAA battery, and wherein the circuit is configured to charge one of a plurality of AA batteries or a plurality of AAA batteries using the electrical power received at the first input interface and the second input interface.

11. The charging device of claim 9, wherein the circuit is configured to charge a plurality of energy storage devices, wherein the circuit comprises a charging circuit for each of the plurality of energy storage devices, wherein each charging circuit is configured to charge an energy storage device until the energy storage device has reached a predetermined charge level and the circuit is configured to continue charging the plurality of energy storage devices until all energy storage devices have reached the predetermined charge level.

12. The charging device of claim 9, further comprising a housing and a light coupled to the housing, wherein the circuit is configured to power the light using power from at least one of the removable energy storage device, the first input interface and the second input interface.

13. The charging device of claim 12, further comprising a selector input configured to enable a user to select a mode from among at least a first mode, a second mode, and a third mode, wherein, in the first mode, the circuit is configured to provide power to the output interface, wherein, in the second mode, the circuit is configured to provide power to the light, and wherein, in the third mode, the circuit is configured to disable both the output interface and the light.

\* \* \* \* \*